United States Patent [19]

Kimball et al.

[11] 4,270,390
[45] Jun. 2, 1981

[54] VIBRATION TEST BEARING TABLE APPARATUS AFFORDING A SINGLE DEGREE OF FREEDOM TEST PIECE PATH

[75] Inventors: David V. Kimball, Monrovia; Daniel L. Baughn, Pomona, both of Calif.

[73] Assignee: Kimball Industries, Inc., Monrovia, Calif.

[21] Appl. No.: 36,343

[22] Filed: May 7, 1979

[51] Int. Cl.³ .............................................. B06B 1/10
[52] U.S. Cl. ..................................................... 73/663
[58] Field of Search ........................ 73/663, 665, 668; 308/3 R, 3 A, 3 C

[56] References Cited

U.S. PATENT DOCUMENTS

| | | | |
|---|---|---|---|
| 3,208,270 | 9/1965 | Hill | 73/665 |
| 3,277,696 | 10/1966 | Gertel | 73/665 |
| 4,164,152 | 8/1979 | Lemonde et al. | 73/665 |

*Primary Examiner*—James J. Gill
*Attorney, Agent, or Firm*—Wagner & Bachand

[57] ABSTRACT

A vibration test, bearing table apparatus comprising a support block having a surface slideably supporting a test piece-carrying slip plate intended to oscillate along a single predetermined axis at a desired test frequency responsive to shaker head driving of the slip plate is provided, with an improvement comprising means within the locus of sliding engagement including a cooperating shaft and bearing assembly distributively coupling the slip plate and support block together in a manner maintaining the test piece on a single degree of freedom path coincident with the test axis, whereby tendencies of the driving force to impart spurious cross-axis pitch, yaw and roll test piece motion relative to the intended test axis are blocked.

14 Claims, 6 Drawing Figures

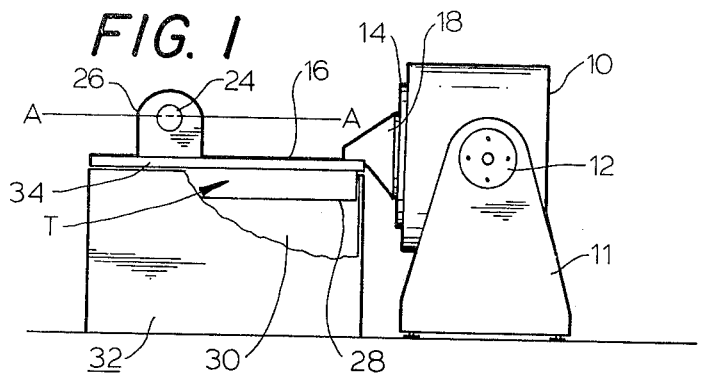
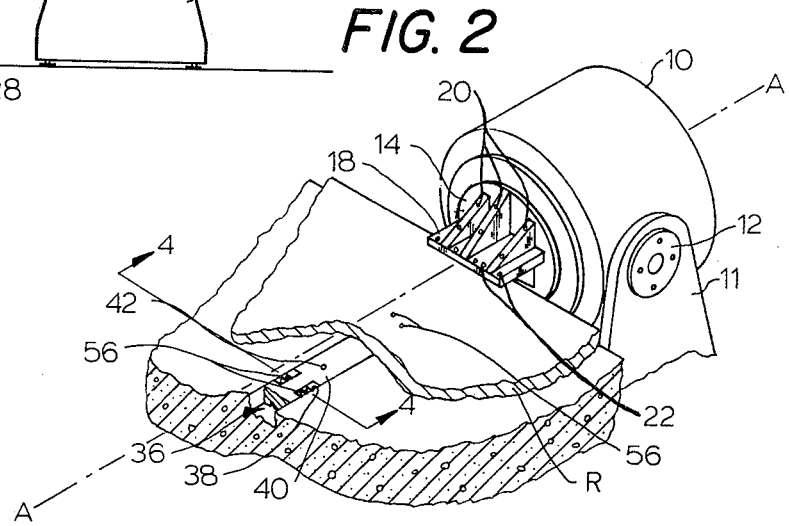
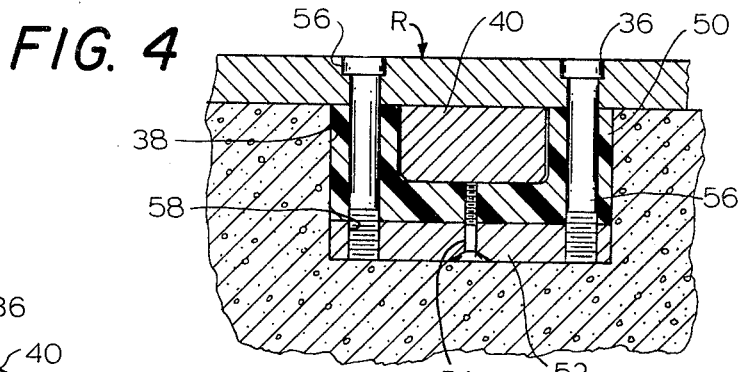
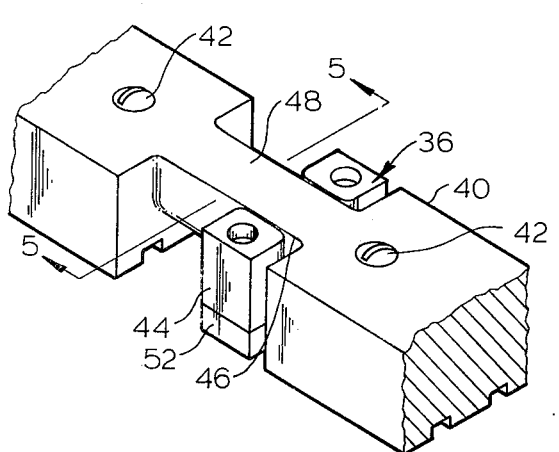
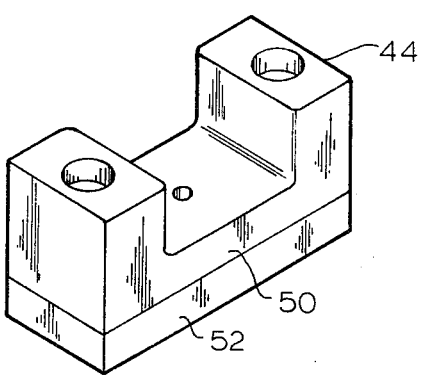
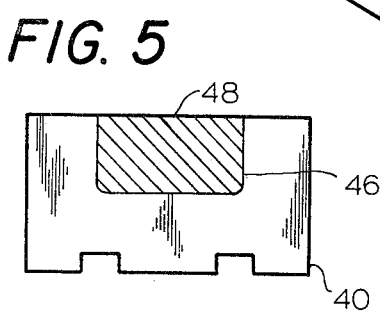

VIBRATION TEST BEARING TABLE APPARATUS AFFORDING A SINGLE DEGREE OF FREEDOM TEST PIECE PATH

BACKGROUND OF THE INVENTION

This invention has to do with vibration test bearing table apparatus of the type comprising a support block having a surface slideably supporting a test piece carrying slip plate intended to oscillate along a single predetermined test axis at a desired test frequency responsive to shaker head driving of the slip plate, and more particularly pertains to improvements in such bearing table apparatus comprising means to maintain the test piece on a single degree of freedom path coincident with the intended test axis against test piece spurious yaw, pitch and roll motions normally tended to be imparted to the test piece by the driving head.

Vibration testing is commonly carried out to ascertain the durability and response to vibratory shock of many assemblies, especially electronic assemblies, designed for severe use conditions. For the purpose of effecting such testing on a reliable and reproducible basis, bearing tables have been developed which comprise a support block usually carried on a mass and which has a highly polished surface adapted to slideably carry a slip plate. The slip plate in turn is coupled to a driving head which is vibrated at a predetermined frequency, the vibrations being carried to the slip plate by a driver bar or similar coupling. The whole function of a test protocol is to obtain reproducible results and for this purpose the operation of the shaker head, the coupling of the shaker head to the slip plate, and the slip plate carriage on the slideable surface defined by the support block are all carefully controlled.

There is, however, a problem in the perfection of the slip plate/support block slideable relation. The test piece is secured to the slip plate and the slip plate is vibrated by operation of the driving head. In practice while the force put out by the driving head is on a single axis the slip plate tends to acquire a variety of spurious cross axis motions including a front to back diving or pitch motion, a crab like or sideways motion termed yaw, and a side-to-side pitch, termed roll motion.

The result of these spurious cross axis motions is that the intended axial motion is not of the desired character and accordingly test results are adversely affected. With stringent requirements for vibration testing, it is not tolerable to have unknown cross axis forces operating which vary, in an unknown manner particularly, the test protocol.

PRIOR ART

It has been proposed to restrict the motion of the slip plate to motion on the intended axis by providing guide rails on the left and right hand edges of the slip plate, the guide rails being secured to the support block. While this expedient appears to be effective in restricting yaw motion particularly, the practical effect is that varying resistances are encountered on the left and right hand edges of the slip plate as it engages, randomly, the guide rails, with the result that new and also unpredictable and unmeasurable scattering of motion forces are introduced into the test scheme, compounding the difficulties of the test operator in determining exactly what vibratory force was put into the test piece.

Temperature variations including those normally encountered in day to day operations exacerbate the difficulties encountered with the side guide rail system previously known. Small changes in dimensions of the slip plate such as may be caused by as little as a 30° F. temperature change make the guide rail adjustment critical, and it is necessarily revised in some cases during the course of testing as temperature conditions change, e.g. from morning to midafternoon. The operator employing the side guide rail system needs extremely close tolerances between the guide rail and the slip plate side edges for effective control of yaw, and yet too close a tolerance will result in the binding of the slip plate against the guide rail rather than slippage particularly as temperatures change and formerly desirable tolerances become intolerable.

SUMMARY OF THE INVENTION

Accordingly, it is a major objective of the present invention to provide improvements in vibration test, bearing table apparatus enabling effective control of the path of test movement. It is a more particular object of the invention to provide improved apparatus for conducting vibration testing including means maintaining the test piece in movement solely along its intended axis. A further object is the provision of means in vibration test bearing table apparatus for limiting test piece movement to a single predetermined path coincident with an intended test axis. A still further object is the provision of such apparatus wherein temperature variations during test cycles are immaterial. Yet another object in the provision of such apparatus wherein the left and right hand edges of the slip plate are untrammeled. A still further object of the invention is to provide such apparatus wherein the slip plate is guided from below by a cooperating shaft and bearing structure assembly lying in a common vertical plane with the intended test axis.

These and other objects of the invention to become apparent hereinafter are realized in accordance with the invention by provision, in a vibration test, bearing table apparatus comprising a support block having a surface slideably supporting a test-piece-carrying slip plate intended to oscillate along a single predetermined test axis at a desired test frequency responsive to shaker head driving of the slip plate, wherein the driving intends to impart spurious cross-axis pitch, yaw and roll test piece motions relative to the intended axis, of the improvement comprising means within the locus of sliding engagement including a cooperating shaft and bearing assembly distributively coupling the slip plate and support block together in a manner maintaining the test piece on a single degree of freedom path coincident with the intended test axis in test piece spurious yaw, pitch roll motion blocking relation. The mentioned bearing assembly may comprise a coaxial series of bearings depending from the underside of the slip plate in journaling relation to the shaft. The bearing assembly may comprise a polytetrafluoroethylene bearing and means to maintain the bearing and shaft engagement including bolts securing the bearing to the slip plate. The apparatus further may include a longitudinally extended recess within the support surface, the shaft being disposed within the recess in fixed relation to the support block for journaling engagement with the bearing. As noted the shaft and bearing assembly and the intended test axis as noted may lie in a common vertical plane, the shaft typically being rectangular in transverse cross section particularly, against roll motion.

In more particularly preferred embodiments of the invention, there is provided in a vibration test, bearing table apparatus, comprising: a support block having a generally rectangular, horizontal, highly polished upper support surface; a generally rectangular, test-piece-carrying rigid slip plate intended to oscillate along a single predetermined horizontal axis at a desired test frequency in sliding engagement with said surface and responsive to shaker head driving of the slip plate; said slip plate having right and left hand side edges parallel to the axis and wherein said driving tends to impart spurious cross axis pitch, yaw and roll test piece motion relative to the intended test axis; the improvement comprising means within the locus of sliding engagement including a longitudinally extended shaft and axially interrupted bearing structure therefor, distributively coupled respectively to the support block and the slip plate freely of the plate side edges; the shaft and bearing structure being relatively configured to maintain the test piece on a single degree of freedom path coincident with the intended test axis in test piece spurious yaw, pitch and roll blocking relation. Further features of this embodiment of the apparatus include a support block surface recess sized for sub-surface reception of the shaft in operating relation; a depending series of U-shaped members defining the bearing structure, the members being longitudinally distributed across the slip plate parallel with the slip plate side edges in surface recess received relation; the shaft having polygonal portions, and the U-shaped members interiorly defining bearing structures locally congruently journaling the shaft portions; the shaft being metal and being periodically laterally received along its length to define a journaling locus for the U-shaped members; and the bearing structure including polytetrafluoroethylene bearing surfaces.

In a highly preferred embodiment of the invention there is provided in a vibration test, bearing table apparatus comprising a support block having a generally rectangular horizontal, highly polished upper surface, a generally rectangular, test-piece-carrying rigid slip plate intended to oscillate along a single predetermined horizontal axis at a desired test frequency in sliding engagement with the surface and responsive to shaker head driving of the slip plate, the slip plate having right and left hand edges parallel to the test axis, the improvement comprising a recess within the support block and means maintaining the test piece on a path coincident with the intended test axis, the means comprising a shaft of rectangular cross section and locally relieved in spaced relation, the shaft being located within the block recess and fixed to the block, the means further comprising received in the block recess, a series of axially alined and spaced U-shaped bearing structures each coinciding with a locally relieved portion of the shaft and comprising a bearing of glass fiber reinforced polytetrafluoroethylene selectively configured to locally journal the opposing shaft portion and saddle means securing the bearing to the slip plate for shaft guided slip plate movement against test piece spurious yaw, pitch and roll motions.

BRIEF DESCRIPTION OF THE DRAWINGS

The invention will be further described as to any illustrative embodiment in conjunction with the attached drawings in which:

FIG. 1 is a side elevational view of a typical vibration test bearing table apparatus and shaker head as may be used with the present invention;

FIG. 2 is a fragmentary view of the improved apparatus according to the invention;

FIG. 3 is a view of the cooperating shaft and bearing apparatus according to the invention;

FIG. 4 is a view in vertical section taken on line 4—4 in FIG. 2;

FIG. 5 is a view in vertical section taken on line 5—5 in FIG. 3; and

FIG. 6 is a perspective view of a U-shaped bearing member according to the invention.

DESCRIPTION OF THE PREFERRED EMBODIMENTS

With reference now to the drawings in detail, a typical vibration test set up is shown in FIG. 1. Shaker 10 carried on carriage 11 supported trunnions 12 and having a vibratory head 14 vibrated by electromagnetic coil means within the shaker and not shown, transmits linear vibrations in the plane of the paper to slip plate 16 through driver bar coupling 18 secured to the head by bolts 20 and to the slip plate by pins 22. The slip plate 16 carries a test piece 24 in fixture 26, the fixture being rigidly welded to the slip plate. The slip plate 16 rests upon a support block 28, generally lubricated with an oil film to define a bearing surface, and comprising finely polished marble. The support block 28 rests upon a substantial mass such as concrete base 30 enclosed within sheet metal housing 32 and resting on the floor or earth. This arrangement of support block 28 and slip plate 16 is generally referred to as a bearing table and is indicated by a T in the drawings.

Thus far described the vibration test, bearing table T set-up is conventional and operates by the shaker head 14 induced motion of the slip plate 16 being transmitted to the test piece 24 held in fixture 26. Vibration rates and periods are determined as is the orientation of the test piece 24 to obtain a desired durability evaluation. Loss of vibration energy from the intended axis of movement, i.e. normal to the head 14 and parallel to the support block 28, precludes meaningful data. The very slippery surface of support block 28, increased by oil lubricant normally, offers essentially no resistance to normal, linear motion, but because of the non-directional nature of the oily surface, there is no resistance to yaw, pitch or roll motions either and the oscillating nature of the head 14 movement tends to impart these spurious cross-axis motions in the slip plate 16 and thus in test piece 24 as well, particularly where the slip plate side edges 34, parallel to the intended axis of test movement are also unconfined, as is desirable in most testing situations.

The present invention addresses this dilemma in a novel way. With references to FIGS. 2 through 5, the invention apparatus is shown, comprising a cooperating shaft and bearing assembly 36, centered on the slip plate 16, lying in the same vertical plane as the intended axis of testing A.

The support block 28 is grooved paraxially with the intended test axis A and generally centrally between the side edges of the block. Resulting longitudinal recess 38 is laterally and vertically sized to snugly receive shaft 40 which is secured in the recess by screws 42. The particular cross-sectional shape of groove 38 is not critical, but a rectangular shape as shown is easily cut accurately into a marble support block and will usually be preferred. Similarly the cross-sectional shape of shaft 40 is not narrowly critical, but is desirably selected to be congruent with the recess 38, and use of a rectangular cross-section enables application of readily available bar stock, and custom cutting, as required, see below, is facilitated.

Filling of the recess 38 with the shaft 40 and bearing assembly is desirable to avoid undue oil loss into the recess. Accordingly the shaft 40 will typically be rectangular and only locally relieved as necessary to accommodate bearings 44 now to be described.

With particular reference to FIGS. 3 and 6, local relief in the shaft 40 is provided in the form of opposed, lateral cuts 46 to accommodate the bearing structure comprising a U-shaped bearing 44. Bearing 44 is typical of a number of bearing assemblies 36 distributed across the slip plate 16 in shaft 40 journaling relation. The bearing 44 comprises a glass fiber reinforced Teflon (Trademark for polytetrafluoroethylene) body 50 specifically shaped to be congruent with the locally relieved shaft portion 48 formed by the opposed cuts 46, and having a metal saddle 52 secured to the Teflon body by bolt 54. See FIG. 4. Bearing 44 is fixed to slip plate 16 by bolts 56 extending through the slip plate and Teflon body 50, and seated in tapped holes 58 in the saddle 52. As shown, the dimensions and configuration of bearings 44 are selected to congruently fit the locally reduced shaft portion 48. Shaft portion 48, also typical of a series of such portions located along the longitudinal axis of the shaft, is relatively more axially extended than the bearing 44 fitted thereto, to allow for relative movement of the bearing upon the shaft. See FIG. 3.

With the foregoing structure in mind, operation of the invention apparatus can now be understood. The shaft 40 with its locally relieved portions 48 axially spaced along its length and distributively, relative to the slip plate 16, and in the vertical plane which includes the intended test axis A, is journaled at such portions in a similarly axially spaced series of bearings 44. The shaft is fixed to the support block 28. The bearings are fixed to the slip plate 16. The relatively greater axial extent of the shaft portion 48 relative to the bearings 44 (uniform for each cooperating shaft portion and bearing) enables the slip plate to move relative to the support block, but with only a single degree of freedom.

A single degree of freedom motion is ensured by:
(1) the lateral angular congruence of the shaft portion 48 and the U-shaped bearing 44 journaling such portion which acts to block side-to-side, motion rolling or rocking;
(2) the axially distributed nature of the shaft and bearing assemblies parallel to the intended test axis A acts to block front to back (or end to end) pitch motion of the slip plate; and
(3) the rectilinear journaling engagement of the shaft portions 48 and the complementary bearings 44 distributed along the length of the slip plate 16, parallel to the intended test axis A, and in the same vertical plane, acts to block yaw motion.

Advantageously over other systems, e.g. side mounted guide rails, the present apparatus is indifferent to temperature induced dimensional change, whether from environmental or mechanical work factors, since slip plate expansion or contraction can occur laterally beyond the connection of the slip plate 16 to the shaft 40 by bearings 44, without causing any perceptible change in the bound region R of the slip plate 16.

I claim:

1. In a vibration test, bearing table apparatus, comprising a support block having a surface slidably supporting a test-piece-carrying slip plate intended to oscillate along a single predetermined test axis at a desired test frequency responsive to shaker head driving of the slip plate, wherein said driving tends to impart spurious cross-axis pitch, jaw and roll test piece motions relative to the intended test axis, the improvement comprising means within the locus of sliding engagement including a shaft and a bearing assembly comprising a coaxial series of bearings depending from the underside of said slip plate in journaling relation to said shaft distributively coupling said slip plate and support block together in a manner maintaining said test piece on a single degree of freedom path coincident with said intended test axis in test piece spurious yaw, pitch and roll motion blocking relation.

2. Apparatus according to claim 1 in which bearing assembly comprises a polytetrafluoroethylene bearing and means to maintain said bearing in shaft engagement including bolts securing said bearing to said slip plate.

3. Apparatus according to claim 1, including also a longitudinally extended recess in said support surface, said shaft being disposed within said recess in fixed relation to said support block for journaling engagement with said bearing.

4. Apparatus according to claim 1, in which said shaft and bearing assembly and the intended test axis lie in a common vertical plane.

5. Apparatus according to claim 1, in which said shaft is rectangular in transverse cross-section against roll motion.

6. Apparatus according to claim 1 in which said bearing includes polytetrafluoroethylene bearing surfaces.

7. In a vibration test, bearing table apparatus, comprising a support block having a generally rectangular horizontal, highly polished upper support surface; a generally rectangular, test-piece-carrying rigid slip plate intended to oscillate along a single predetermined horizontal axis at a desired test frequency in sliding engagement with said surface and responsive to shaker head driving of the slip plate; said slip plate having right and left hand side edges parallel to said axis; and wherein said driving tends to impart spurious cross axis pitch, jaw and roll test piece motions relative to the intended test axis; the improvement comprising means within the locus of sliding engagement including a longitudinally extended shaft and axially interrupted bearing structure therefor comprising a series of bearings journaling said shaft to distributively couple said support block and said slip plate freely of said plate side edges, said shaft and bearing structure being relatively configured to maintain said test piece on a single degree of freedom path coincident with said intended test axis in test piece spurious yaw, pitch and roll blocking relation.

8. Apparatus according to claim 7, including also a support block surface recess sized for sub-surface reception of said shaft in operating relation.

9. Apparatus according to claim 8 defining said bearing structure, including also a depending series of U-shaped members and said members being longitudinally distributed across said slip plate parallel with said slip plate side edges in surface recess received relation.

10. Apparatus according to claim 9, in which said shaft has polygonal portions, and said U-shaped members interiorly define bearing structures locally congruently journaling said shaft portions.

11. Apparatus according to claim 10, in which said shaft is metal.

12. In a vibration test, bearing table apparatus, comprising a support block having a generally rectangular horizontal, highly polished upper surface; a generally rectangular test-piece-carrying rigid slip plate intended to oscillate along a single predetermined horizontal axis at a desired test frequency in sliding engagement with said surface and responsive to shaker head driving of the slip plate; said slip plate having right and left hand side edges parallel to said axis; and wherein said driving tends to impart spurious cross axis pitch, yaw and roll test piece motions relative to the intended test axis; the improvement comprising means within the locus of sliding engagement including a longitudinally extended shaft periodically relieved along its length to define an axial succession of journaling locus, and axially interrupted bearing structure therefor distributively coupled to said support block and said slip plate freely of said side plate edges, said shaft and bearing structure being relatively configured to maintain said test piece on a single degree of freedom path coincident with said intended test axis in test piece spurious yaw, pitch and roll blocking relation.

13. Apparatus according to claim 12 in which said bearing structure includes polytetrafluorothylene bearing surfaces.

14. In a vibration test, bearing table apparatus comprising a support block having a generally rectangular horizontal, highly polished upper surface, a generally rectangular, test piece carrying rigid slip plate intended to oscillate along a single predetermined horizontal axis at a desired test frequency in sliding engagement with said surface and responsive to shaker head driving of the slip plate, said slip plate having right and left hand edges parallel to said test axis, the improvement comprising a recess within said support block and means maintaining said test piece on a path coincident with said intended test axis, said means comprising a shaft of rectangular cross-section and locally relieved in spaced relation, said shaft being located within said block recess and fixed to said block, said means further comprising received in said block recess a series of axially alined and spaced U-shaped bearing structures each coinciding with a locally relieved portion of said shaft and each comprising a bearing of glass fiber-reinforced polytetrafluoroethylene selectively configured to locally journal the opposing shaft portion, and saddle means securing said bearing to said slip plate for shaft guided slip plate movement against spurious yaw, pitch and roll motion of said test piece.

* * * * *